(12) United States Patent
Hasegawa

(10) Patent No.: US 10,089,211 B2
(45) Date of Patent: Oct. 2, 2018

(54) INFORMATION PROCESSING APPARATUS THAT EXECUTES PROCESSING BY USING A BYTECODE, METHOD FOR CONTROLLING THE SAME, AND NON-TRANSITORY COMPUTER-READABLE MEDIUM

(71) Applicant: CANON KABUSHIKI KAISHA, Tokyo (JP)

(72) Inventor: Kiwamu Hasegawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 197 days.

(21) Appl. No.: 14/876,130

(22) Filed: Oct. 6, 2015

(65) Prior Publication Data

US 2016/0117236 A1   Apr. 28, 2016

(30) Foreign Application Priority Data

Oct. 23, 2014   (JP) .................. 2014-216634

(51) Int. Cl.
*G06F 11/34* (2006.01)
*G06F 11/30* (2006.01)
*G06F 11/36* (2006.01)

(52) U.S. Cl.
CPC .......... *G06F 11/3636* (2013.01); *G06F 11/30* (2013.01); *G06F 11/3037* (2013.01);
(Continued)

(58) Field of Classification Search
None
See application file for complete search history.

(56) References Cited

U.S. PATENT DOCUMENTS 6,760,903 B1 * 7/2004 Morshed ............. G06F 11/3466
717/130
7,367,025 B1 * 4/2008 Nikolov ............. G06F 11/3624
714/E11.207

(Continued)

FOREIGN PATENT DOCUMENTS

JP    2011238233 A    11/2011

OTHER PUBLICATIONS

Office Action issued in Japanese Appln. No. 2014-216634 dated Jul. 6, 2018.

(Continued)

*Primary Examiner* — Chat Do
*Assistant Examiner* — Douglas Slachta
(74) *Attorney, Agent, or Firm* — Rossi, Kimms & McDowell LLP

(57) ABSTRACT

An information processing apparatus comprises: an insertion unit that inserts, into a class file that corresponds to one application, a first bytecode for tallying information about a resource used by an object generated by execution of a bytecode that is included in the class file; and a tallying unit that, if an application generates an object, tallies information about a resource used by the object generated by the application, wherein the one application that has executed the first bytecode is identified by execution of the first bytecode, the one application thus identified and information about a resource used by a generated object are registered to a storage unit in association with each other, and the tallying unit tallies a resource usage amount for each application based on the information registered to the storage unit.

8 Claims, 18 Drawing Sheets

(52) U.S. Cl.
CPC ...... *G06F 11/3409* (2013.01); *G06F 11/3466* (2013.01); *G06F 2201/865* (2013.01)

(56) References Cited

U.S. PATENT DOCUMENTS

| | | | |
|---|---|---|---|
| 8,566,800 B2 | 10/2013 | Gagliardi | |
| 2004/0133882 A1* | 7/2004 | Angel | G06F 11/3612 717/130 |
| 2006/0136886 A1* | 6/2006 | Patterson | G06F 9/4825 717/141 |
| 2006/0136916 A1* | 6/2006 | Rowland | G06F 9/485 718/100 |
| 2006/0253507 A1* | 11/2006 | Schank | H04L 67/125 |
| 2009/0031066 A1* | 1/2009 | Bansal | G06F 9/5011 710/113 |
| 2009/0199196 A1* | 8/2009 | Peracha | G06F 11/3409 718/104 |
| 2010/0011341 A1* | 1/2010 | Baierl | G06F 11/3624 717/110 |
| 2014/0082596 A1* | 3/2014 | Judelman | G06F 9/443 717/130 |

OTHER PUBLICATIONS

Czajkowski et al. "JRes: A Resource Accounting Interface for Java." In Proceedings of the 1998 ACM OOPSLA Conference. Oct. 1998: 21-35. Vancouver, BC.

Pearce et al. "Profiling with AspectJ." Software—Practice and Experience. 2005: 7-9. 00:1-1.

* cited by examiner

F I G. 14
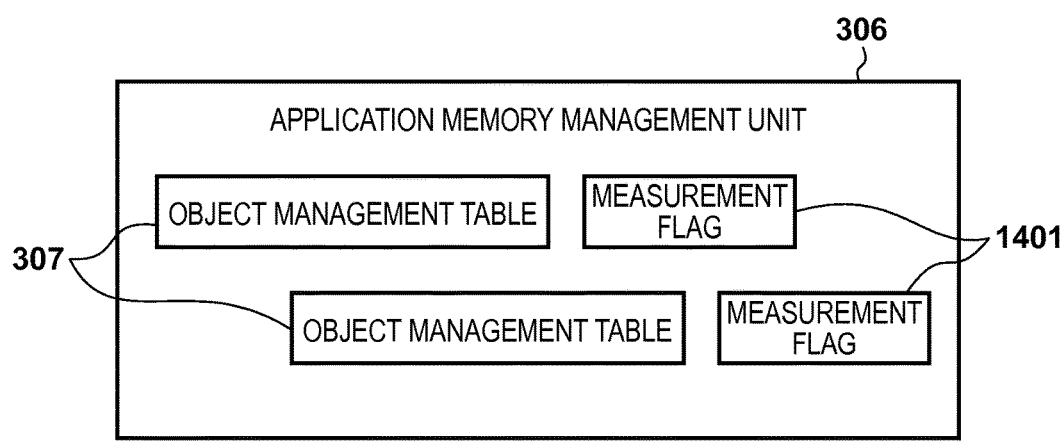

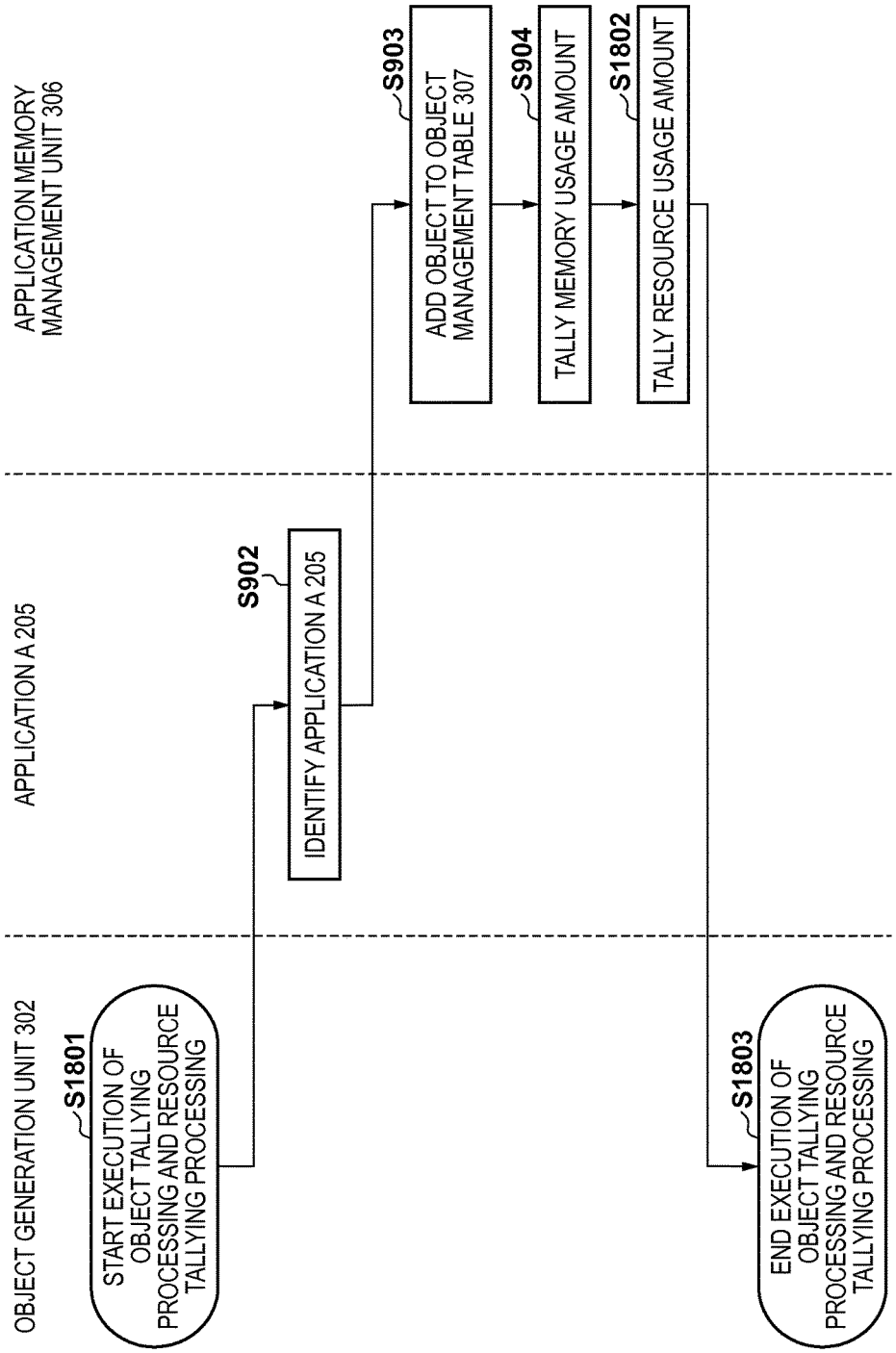

INFORMATION PROCESSING APPARATUS THAT EXECUTES PROCESSING BY USING A BYTECODE, METHOD FOR CONTROLLING THE SAME, AND NON-TRANSITORY COMPUTER-READABLE MEDIUM

BACKGROUND OF THE INVENTION

Field of the Invention

The present invention relates to an information processing apparatus, a method for controlling the same, and a non-transitory computer-readable medium. In particular, the present invention relates to a resource management technology employed in an information processing apparatus that causes a plurality of applications to operate on a single process.

Description of the Related Art

A multi-function peripheral (MFP), which is a type of information processing apparatuses, is capable of causing applications, which achieve the function of, for example, copying, scanning, and printing of documents, to operate. Such applications are often executed on the same process in an MFP in order to suppress the amount of CPU usage and memory usage. It is possible to know the total amount of memory that is used on a single process, and accordingly, when only a single application is executed, it is also possible to know the amount of memory used by the application. However, when a plurality of applications are executed on a single process, it is difficult to know the amount of memory used by each application because it is only possible to know the amount of memory used by the entire process.

The amount of memory used by each application can be measured by, for example, dumping the contents of the heap memory that is in use (hereinafter "heap dump"), and analyzing the contents by using an information processing apparatus other than the MFP. Alternatively, the amount of memory used by each application can be measured on the MFP by modifying the applications so that every application performs a memory usage measurement. However, it is impossible to perform a memory usage measurement without modifying the configurations of the existing applications.

Meanwhile, Japanese Patent Laid-Open No. 2011-238233 discloses a method for performing a performance analysis without modifying existing applications. According to the method disclosed in Japanese Patent Laid-Open No. 2011-238233, the performance of an application that is being executed can be analyzed by monitoring the bytecode of a class that is loaded by an existing application, dynamically specifying a method that is to be executed by the application, and measuring the execution time.

However, with the method disclosed in Japanese Patent Laid-Open No. 2011-238233, it is impossible to analyze the memory used by the application.

SUMMARY OF THE INVENTION

In view of the problems above, the present invention, when applied to an information processing apparatus that causes a plurality of applications to operate on a single process, allows for a measurement, on the information processing apparatus, of the amount of memory usage for each of the applications, even when they are existing applications.

According to one aspect of the present invention, there is provided an information processing apparatus that includes a plurality of applications that execute processing by using a bytecode that is included in a class file, the information processing apparatus comprising: an insertion unit configured to insert, into a class file that corresponds to one application, a first bytecode for tallying information about a resource used by an object generated by execution of a bytecode that is included in the class file; and a tallying unit configured to, if an application generates an object, tally information about a resource used by the object generated by the application, wherein the one application that has executed the first bytecode is identified by execution of the first bytecode, the one application thus identified and information about a resource used by a generated object are registered to a storage unit in association with each other, and the tallying unit tallies a resource usage amount for each application based on the information registered to the storage unit.

According to another aspect of the present invention, there is provided a method for controlling an information processing apparatus that includes a plurality of applications that execute processing by using a bytecode that is included in a class file, the method comprising: an insertion step of, with an insertion unit, inserting, into a class file that corresponds to one application, a first bytecode for tallying information about a resource used by an object generated by execution of a bytecode that is included in the class file; and a tallying step of, with a tallying unit, if an application generates an object, tallying information about a resource used by the object generated by the application, wherein the one application that has executed the first bytecode is identified by execution of the first bytecode, the one application thus identified and information about a resource used by a generated object are registered to a storage unit in association with each other, and the tallying unit tallies a resource usage amount for each application based on the information registered to the storage unit.

According to another aspect of the present invention, there is provided a non-transitory computer-readable medium storing a program for causing a computer to function as: an insertion unit configured to insert, into a class file that corresponds to one application from among a plurality of applications that execute processing by using a bytecode that is included in a class file, a first bytecode for tallying information about a resource used by an object generated by execution of a bytecode that is included in the class file; and a tallying unit configured to, if an application generates an object, tally information about a resource used by the object generated by the application, wherein the one application that has executed the first bytecode is identified by execution of the first bytecode, the one application thus identified and information about a resource used by a generated object are registered to a storage unit in association with each other, and the tallying unit tallies a resource usage amount for each application based on the information registered to the storage unit.

The present invention, when applied to an information processing apparatus that causes a plurality of applications to operate on a single process, allows for a measurement, on the information processing apparatus, of the amount of memory usage for each of the applications even when they are existing applications.

Further features of the present invention will become apparent from the following description of exemplary embodiments (with reference to the attached drawings).

BRIEF DESCRIPTION OF THE DRAWINGS

FIG. 14 is a diagram showing an example of a configuration of an application memory management unit according to a third embodiment.

FIG. 18 is a flowchart for tallying processing according to the fourth embodiment.

DESCRIPTION OF THE EMBODIMENTS

The following describes embodiments of the present invention with reference to the drawings.

First Embodiment

Hardware Configuration

Figure 1:
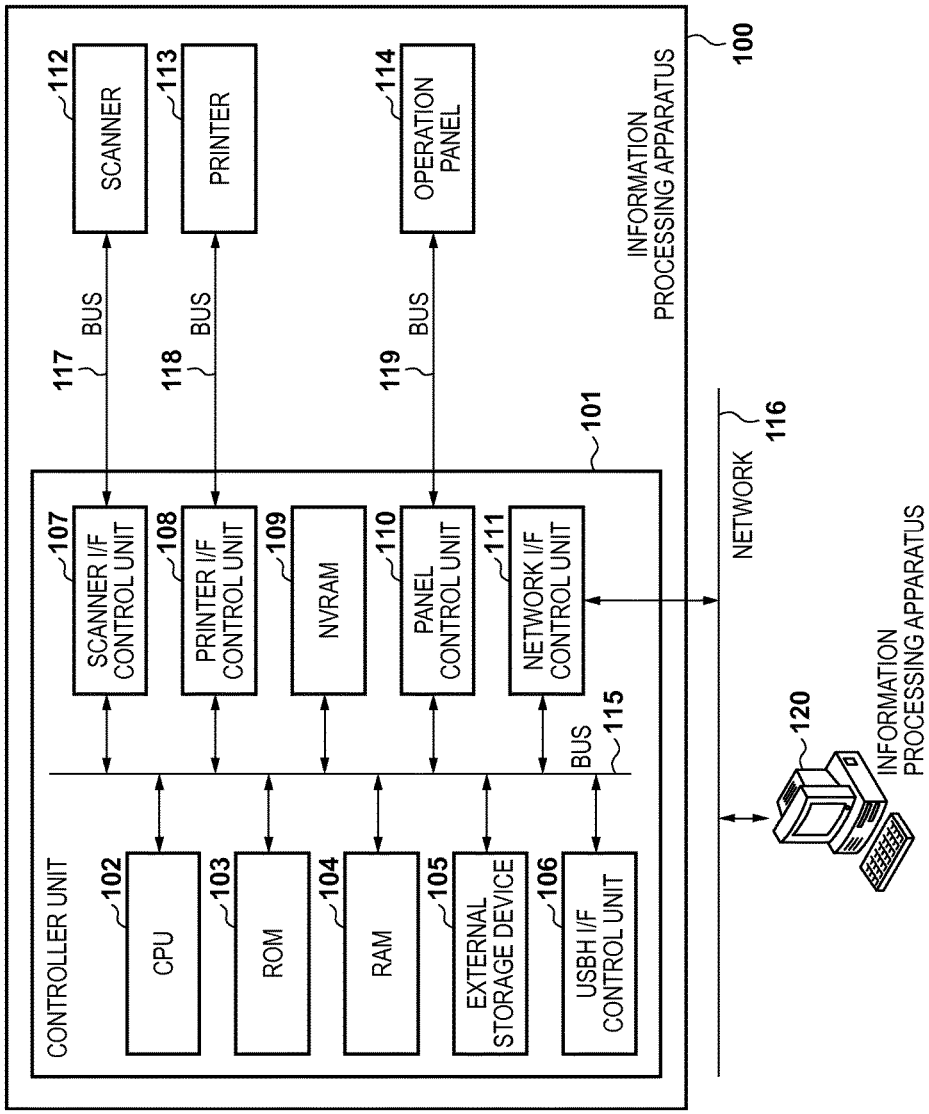
FIG. 1 is a diagram showing an example of a hardware configuration of an information processing apparatus according to the present invention.

The following describes a first embodiment of the present invention. FIG. 1 shows an example of the configuration of hardware that encompasses an information processing apparatus that is common to each embodiment of the present invention.

An information processing apparatus 100 includes a controller unit 101, a scanner 112, a printer 113, and an operation panel 114. The controller unit 101 is to be connected to the scanner 112 and the printer 113 via a bus 117 and a bus 118, respectively.

A CPU 102 executes a software program for the information processing apparatus 100, and controls the entire apparatus. A ROM 103 is a read-only memory, and stores a boot program, constant parameters, etc., for the apparatus. A RAM 104 is a random access memory, and is used for storing temporary data when the CPU 102 controls the apparatus. An external storage device 105 is used for storing various sorts of data such as applications that have been installed, data for the applications, and print data. A USBH I/F control unit 106 is a unit for controlling a USB host interface, and controls communication with various sorts of USB devices.

A scanner I/F control unit 107 is to be connected to the scanner 112 via the bus 117, and controls the scanner 112. A printer I/F control unit 108 is to be connected to the printer 113 via the bus 118, and controls the printer 113. An NVRAM 109 is a non-volatile memory, and stores various sorts of setting values for an application management apparatus. A panel control unit 110 controls the operation panel 114 to display various sorts of information and to receive instructions that are input by a user. A network I/F control unit 111 controls transmission/reception of data to/from a network 116. The network 116 is also connected to an information processing apparatus 120 other than the information processing apparatus 100. Via the network 116, the information processing apparatus 120 can instruct the information processing apparatus 100 to, for example, transmit print jobs, and start up, stop, install, or uninstall applications that operate on the information processing apparatus 100.

The bus 115 is to be connected to the CPU 102, the ROM 103, the RAM 104, the external storage device 105 and the USBH I/F control unit 106. The bus 115 is also to be connected to the scanner I/F control unit 107, the printer I/F control unit 108, the NVRAM 109, the panel control unit 110, and the network I/F control unit 111. The bus 115 is a system bus, via which control signals from the CPU 102 and data signals to be exchanged between apparatuses are transmitted and received.

Software Configuration

Figure 2:
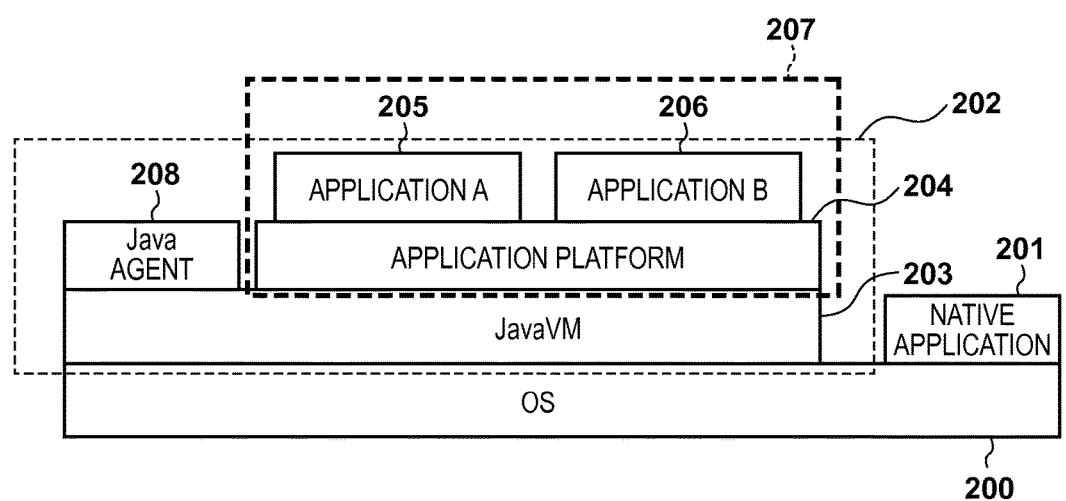
FIG. 2 is a diagram showing an example of a configuration of software for the entire information processing system according to the present invention.

FIG. 2 is a diagram illustrating an example of the configuration of software for the entire information processing system that is common to each embodiment of the present invention. FIG. 2 shows an example of the configuration of pieces of software that operate on pieces of hardware of the information processing apparatus 100 such as the CPU 102, the RAM 104, and the external storage device 105. Note that processing executed in each of these modules is achieved by reading out programs stored in the ROM 103 or the external storage device 105 and executing predetermined processing by using the RAM 104 as a work area, in response to instructions from the CPU 102. Also note that all pieces of information generated by executing predetermined processing are to be stored in the RAM 104 or the external storage device 105. The processing executed in each module as described above is the same in the following description, and is omitted from the following description.

Although the software configuration in FIG. 2 is represented with a hierarchical structure for the purpose of illustration, the layers are not necessarily clearly divided into upper layers and lower layers, and they may have a parallel relationship, depending on the function. In other words, the mode in which the software structure according to the present invention is embodied is not limited to this format.

An operating system (OS) 200 executes process management, memory management, and input/output management. A native application 201 is a program for achieving basic functions of the apparatus, such as copying. A Java software unit 202 includes a Java VM 203, an application platform 204, an application A 205, an application B 206, and a Java agent 208.

The Java VM 203 is a virtual machine that executes Java programs. The application platform 204 is a program that performs application lifecycle management for at least one application program on the single Java VM 203, by which the application program is started up, stopped, installed, or uninstalled, for example.

The application A 205 and the application B 206 are application programs that operate on the application platform 204. The application platform 204, the application A 205, and the application B 206 are collectively processed as a single Java application 207 by the Java VM 203. The Java agent 208 is loaded by the Java VM 203, and, for example, monitors classes that are loaded by the application platform 204.

Figure 3:
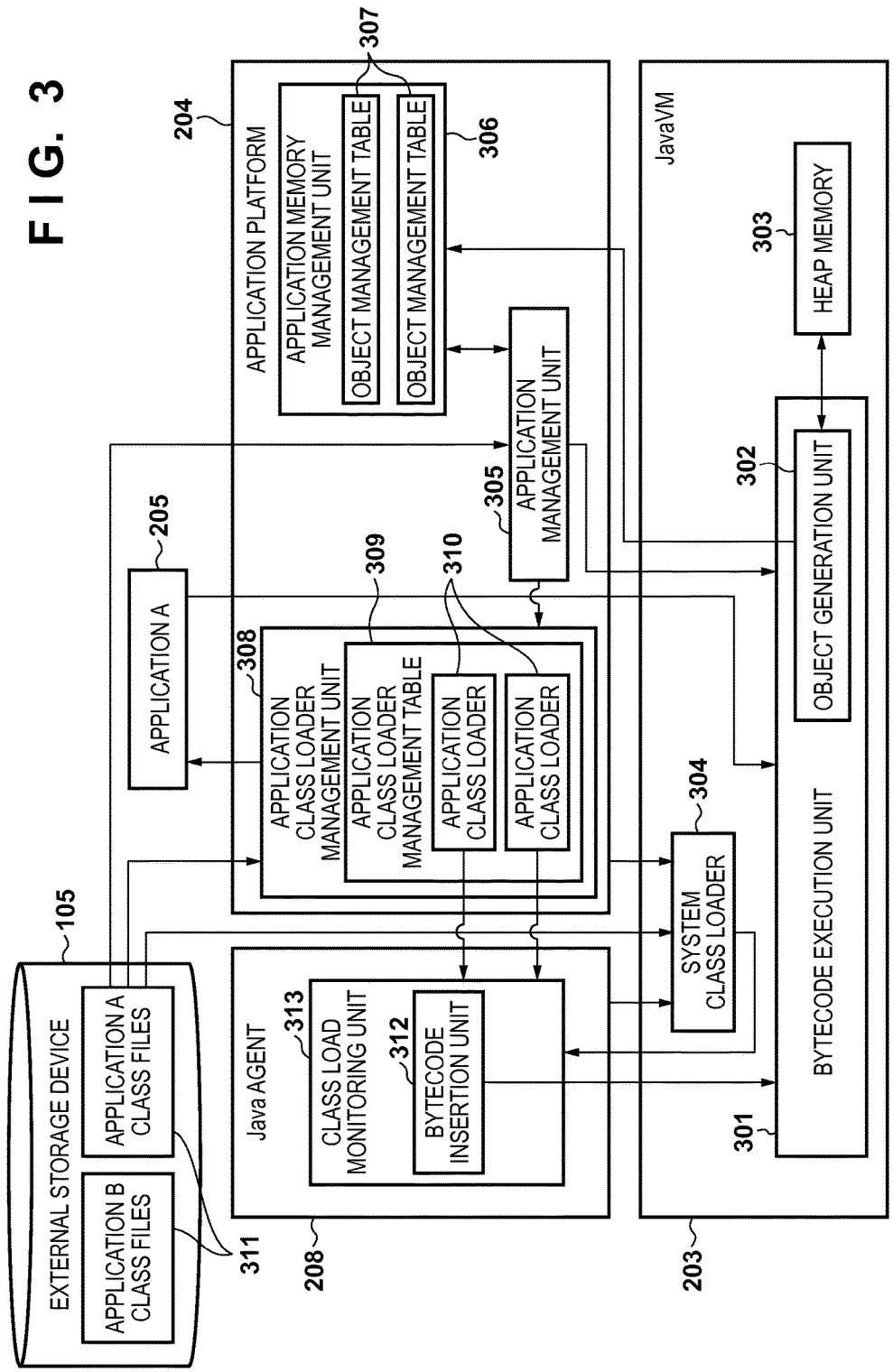
FIG. 3 is a diagram showing an example of a software configuration according to a first embodiment.

FIG. 3 shows an example of modules that constitute the Java software unit 202. The Java VM 203 includes a bytecode execution unit 301, a heap memory 303, and a system class loader 304.

The bytecode execution unit 301 interprets and executes bytecodes, which are Java® program codes. An object generation unit 302 instantiates classes and generates Java objects according to instructions from program codes that are executed by the bytecode execution unit 301. The heap memory 303 is a memory area that is managed by the Java VM 203, and holds Java objects generated by the execution of Java programs. The system class loader 304 loads classes that are managed by the Java VM 203. The classes managed by the Java VM 203 include the application platform 204 and the Java agent 208.

The application platform 204 includes an application management unit 305, an application memory management unit 306, and an application class loader management unit 308. The application management unit 305 performs application lifecycle management, by which application programs are started up, stopped, installed, or uninstalled, for example. The application memory management unit 306 generates and manages an object management table 307 for each application, and manages the amount of memory usage (the amount of consumption with respect to the storage area) for each application. The object management tables 307 are generated and stored in a storage unit in one-to-one correspondence with applications, and manage Java objects that are generated by the applications.

The application class loader management unit 308 includes an application class loader management table 309, and manages an application class loader 310 for each application. Therefore, when an application is installed in the external storage device 105 for the information processing apparatus 100, the system class loader 304 generates the application class loader 310 by loading the class of the application class loader 310. The application class loader 310 reads a class file from among application A class files 311 stored in the external storage device 105, and loads the class.

The Java agent 208 has a class load monitoring unit 313 and a bytecode insertion unit 312. The class load monitoring unit 313 detects that the system class loader 304 acquires a class file, and executes the bytecode insertion unit 312. The bytecode insertion unit 312 further inserts a bytecode into the bytecode of the class file acquired by the system class loader 304, thereby converting the class file to a new class file. In other words, the bytecode execution unit 301 interprets and executes this new class file.

Table 1 shows an example of the configuration of the object management table 307. The object management table 307 manages pairs of a generated object and a memory usage amount. The object management table 307 is generated by the application memory management unit 306 for each application. The generated object refers to a Java object generated by an application. The memory usage amount is the size of the memory area used by the generated object.

TABLE 1

| Generated object | Memory usage amount |
|---|---|
| objectA001 | 100 KB |
| objectA002 | 120 KB |
| objectA003 | 80 KB |

Table 2 shows an example of the configuration of the application class loader management table 309. The application class loader management table 309 manages pairs of: an application ID, which is the identifier of an application; and the application class loader 310 used by the application.

TABLE 2

| Application ID | Application class loader 310 |
|---|---|
| 11-1111-1111 | Application A class loader |
| 22-2222-2222 | Application B class loader |
| 33-3333-3333 | Application C class loader |

Outline of Processing

Figure 4:
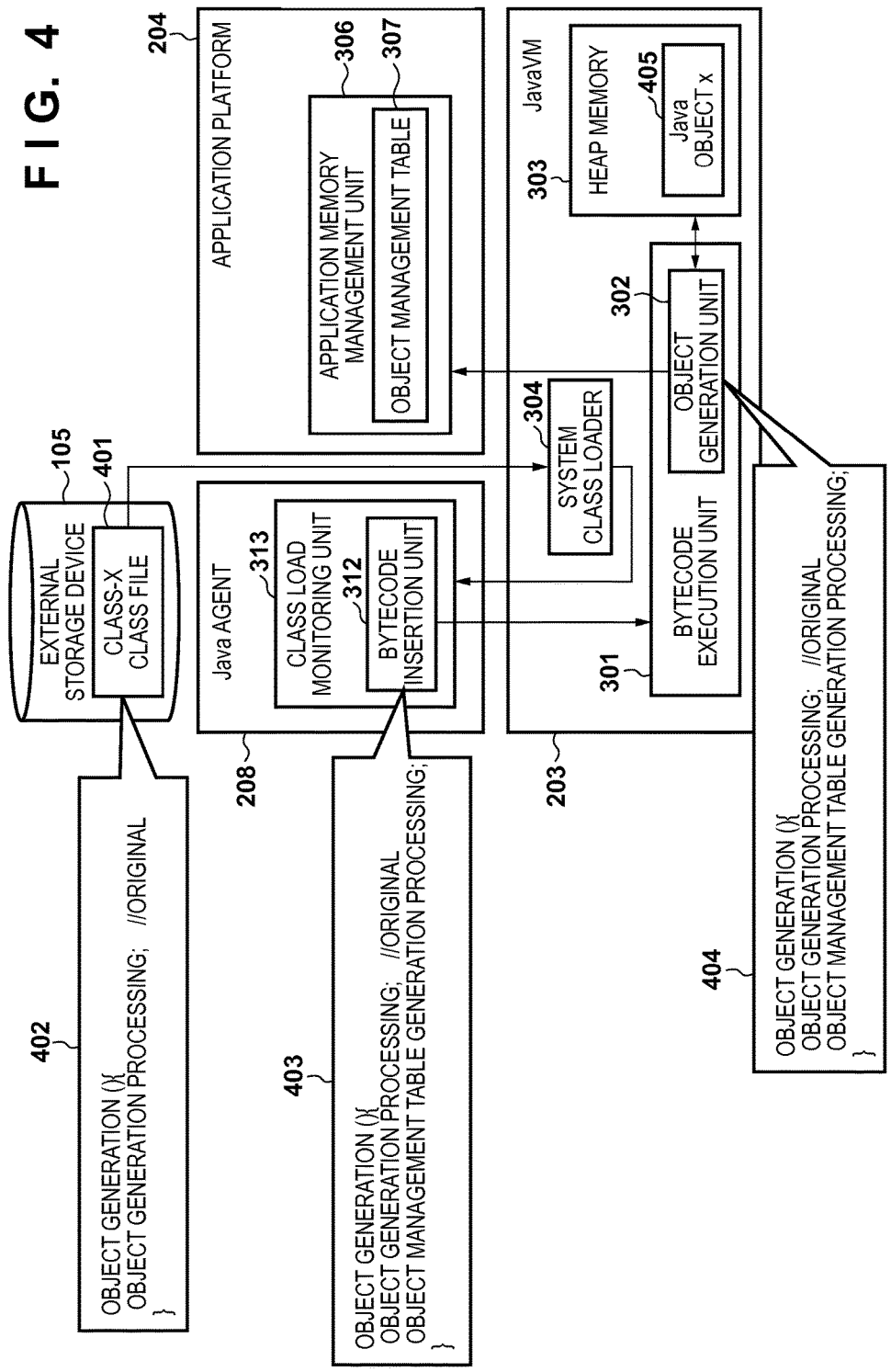
FIG. 4 is a diagram illustrating flows in bytecode insertion executed by software.

FIG. 4 shows an example of the case in which the bytecode insertion unit 312 newly inserts a bytecode for executing object management table generation processing after a bytecode for generating a Java object, which is included in a class-X class file 401.

A bytecode 402 of the class-X class file 401, which is stored in the external storage device 105, is the bytecode for executing processing to be executed at object generation. In the following, the bytecode of a class file before the bytecode insertion unit 312 inserts a bytecode is referred to as "the original bytecode". When the class-X class file 401 is read by the system class loader 304, the class load monitoring unit 313 detects the reading. After that, the bytecode insertion unit 312 newly inserts a bytecode for executing object management table generation processing after the original bytecode. Then, the bytecode insertion unit 312 passes the original bytecode and the bytecode 403 after insertion processing to the bytecode execution unit 301. This bytecode insertion processing makes no changes to the class-X class file 401 in the external storage device 105. However, the bytecode execution unit 301 interprets and executes the bytecode 404 as a class file that includes object management table generation processing. The object generation unit 302 generates a Java object x 405 by instantiating the class X according to the instruction that is executed by the bytecode execution unit 301, and stores it in the heap memory 303. Then, after executing object generation processing, the object generation unit 302 causes the application memory management unit 306 to generate the object management table 307.

Next, a brief description using an example is given of the flow of memory usage amount measurement processing according to the present embodiment.

Figure 5:
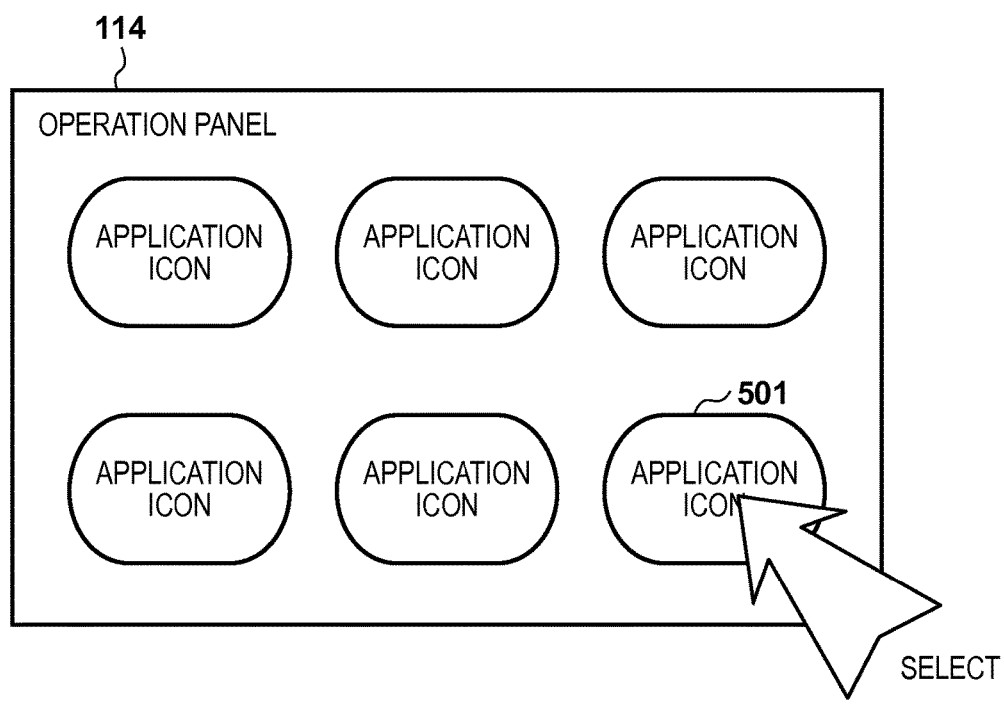
FIG. 5 is a diagram showing an example of a screen displayed by an operation panel.

FIG. 5 is a diagram showing an example of a screen displayed by the operation panel 114. The screen of the operation panel 114 shows an application icon 501 for executing the application A 205. When the user selects the application icon 501 on the operation panel 114, the panel control unit 110 detects the selection and instructs the CPU 102 to execute the application A 205. Upon execution of the application A 205, the application A 205 instructs the object generation unit 302 to instantiate the class and generate a Java object. After the object generation unit 302 has generated a Java object, the application memory management unit 306 adds the generated Java object to the object management table 307 in the application memory management unit 306.

Figure 6:
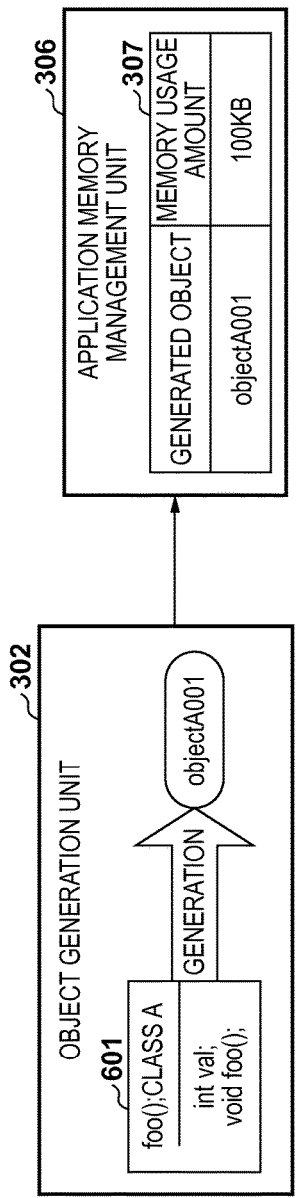
FIGS. 6A, 6B, and 6C are diagrams illustrating an example of a case of adding an object to an object management table.

How the generated Java object is added is shown in FIG. 6A to FIG. 6C. For example, it is assumed that a class A601 is instantiated during the execution of the application A 205, and that Java objects, namely an objectA001, an objectA002, . . . , and an objectA100, are sequentially generated. Here, a variable val and a method foo( ) are defined for the class A601, and when the objectA001, the objectA002, etc., are generated, variables and methods for these objects are defined as well. As shown in FIG. 6A, the object generation unit 302 generates the objectA001 by instantiating the class A601. Then, the object generation unit 302 passes the objectA001 to the application memory management unit 306.

Upon receiving the objectA001, the application memory management unit 306 adds information about the objectA001 to the object management table 307. Similarly, upon generation of the objectA002, information about the objectA002 is added to the object management table 307, as shown in FIG. 6B. Thus, pieces of information about Java objects generated during the execution of the application A 205 are added to the object management table 307. Then, the application memory management unit 306 tallies the respective memory usage amounts of the Java objects included in the object management table 307. FIG. 6C shows the result of tallying the memory usage amounts. By referring to this result of tallying the memory usage amounts, the application management unit 305 can acquire the memory usage amount of the application A 205, during the execution of the application.

Processing Flow

Figure 7:
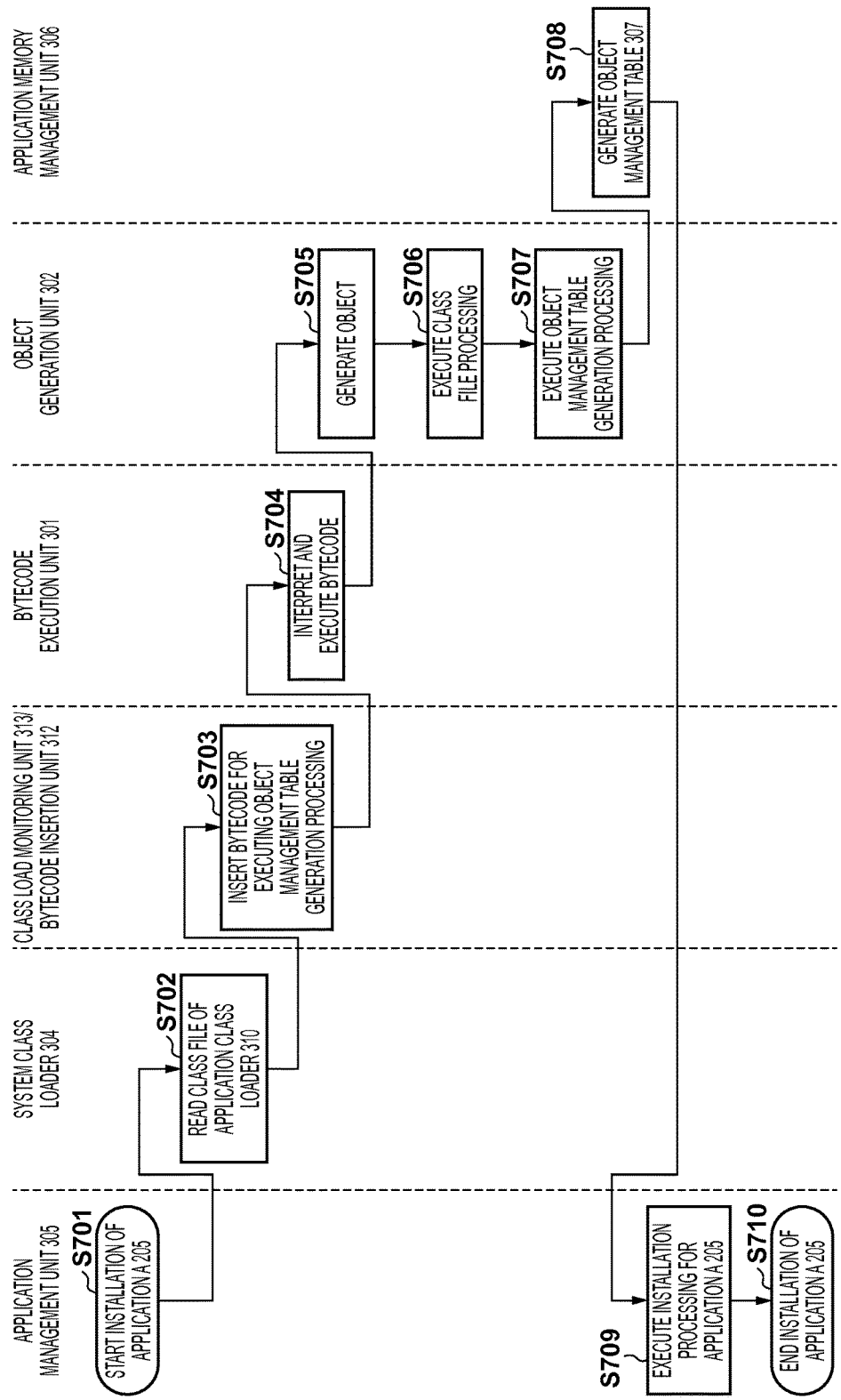
FIG. 7 is a flowchart for installing an application according to the first embodiment.
Figure 8:
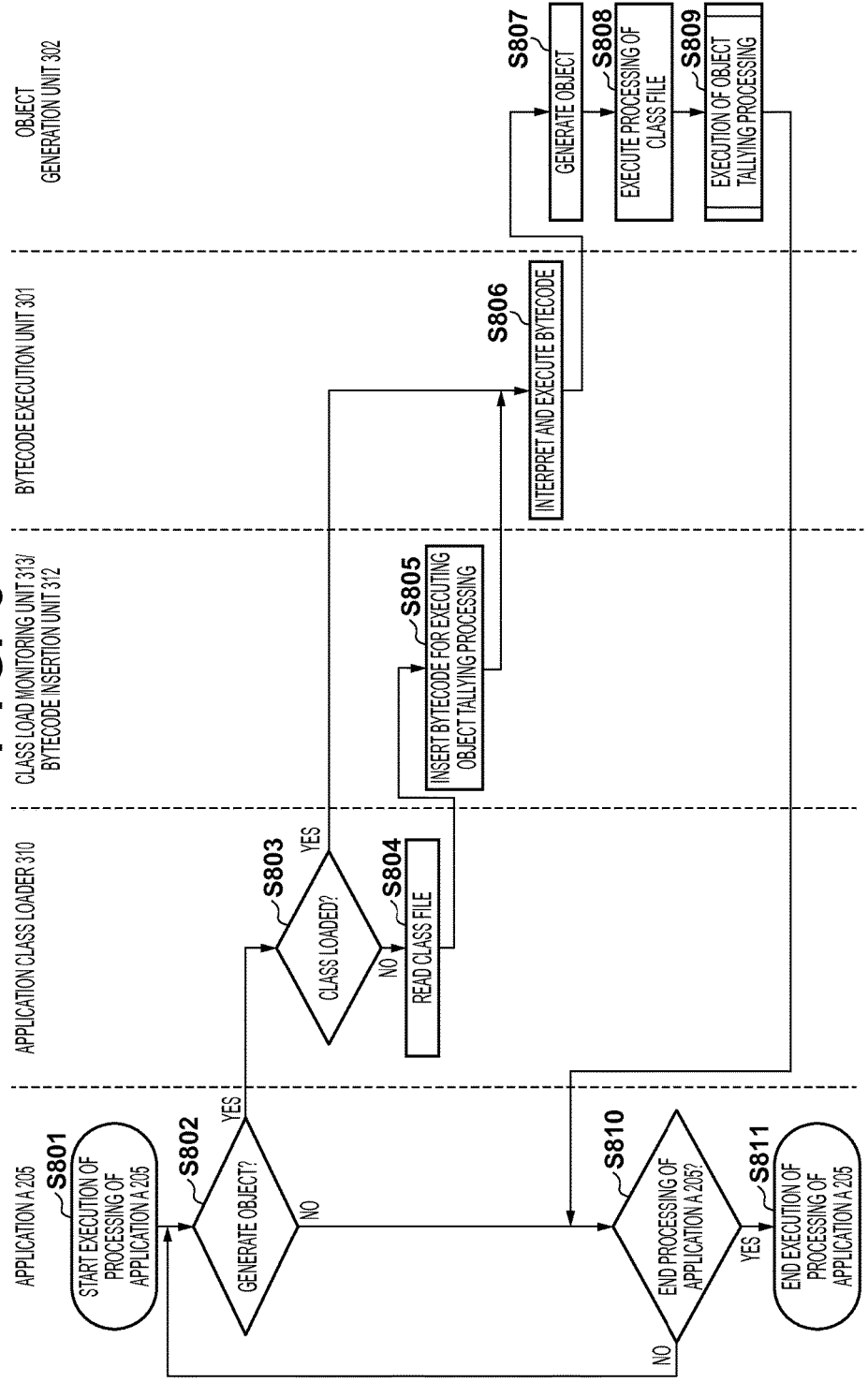
FIG. 8 is a flowchart for starting an application according to the first embodiment.
Figure 9:
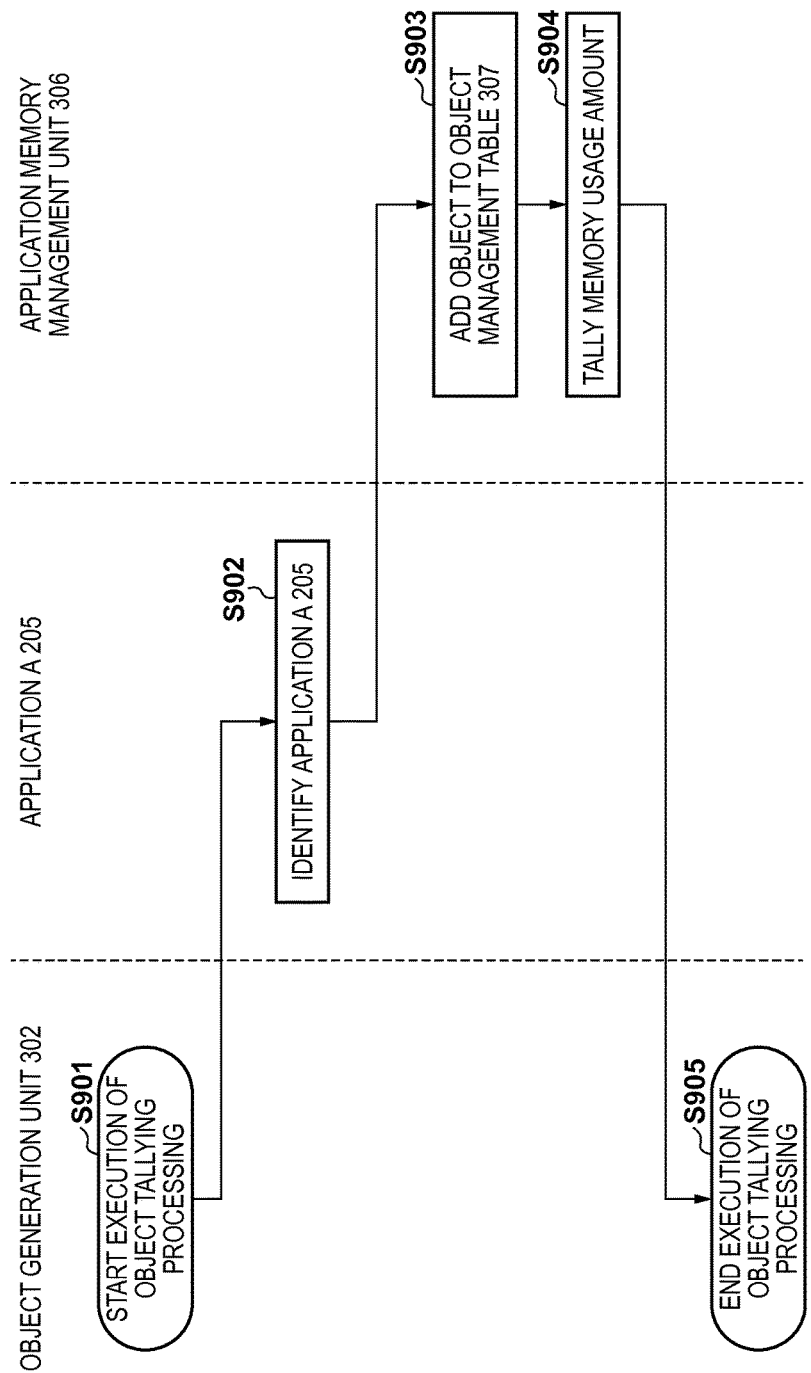
FIG. 9 is a flowchart for object tallying processing according to the first embodiment.

Next, a description is given of a processing flow according to the present embodiment, with reference to FIG. 7 to FIG. 9.

Application Installation Processing

FIG. 7 is a flowchart showing processing executed by the application management unit 305 of the application platform 204 when installing the application A 205. The processing according to this flowchart is achieved by the CPU 102 reading and executing programs stored in the external storage device 105 or the like, and causing the programs to function as components that execute the processing.

In step S701, when the information processing apparatus 120 makes an instruction to install the application A 205, the network I/F control unit 111 receives the instruction via the network 116, and instructs the CPU 102 to install the application A 205. When the CPU 102 receives the instruction to install the application A 205, the application management unit 305 starts installing the application A 205.

In step S702, when the installation of the application A 205 is started, the application class loader management unit 308 adds the application class loader 310 for the application A 205 to the application class loader management table 309. At this moment, the application class loader 310 for the application A 205 has not been loaded, and therefore the system class loader 304 reads the class file of the application class loader 310, which is stored in the external storage device 105.

In step S703, the class load monitoring unit 313 detects that the class file has been read in step S702, and transmits a bytecode insertion instruction to the bytecode insertion unit 312. The bytecode insertion unit 312 inserts a bytecode for executing management table generation processing after the bytecode for executing Java object generation processing, which is included in the class file in the application class loader 310. This object management table generation processing is processing by which the object generation unit 302 executes step S708. Note that the bytecode for executing object management table generation processing may be inserted before the bytecode for Java object generation processing. When the bytecode insertion unit 312 completes bytecode insertion, step S704 is executed next.

In step S704, the bytecode execution unit 301 interprets and executes the bytecode received from the bytecode insertion unit 312.

In step S705, according to the instruction executed in step S704, the object generation unit 302 instantiates the class of the application class loader 310 and generates a Java object.

In step S706, the object generation unit 302 executes Java object generation processing included in the class file of the application class loader 310.

In step S707, the object generation unit 302 executes object management table generation processing. Note that, in step S703, in the case where the bytecode for executing object management table generation processing is inserted before the bytecode for executing Java object generation processing, step S707 and then step S706 are executed in this order.

In step S708, the application memory management unit 306 generates the object management table 307 for the application A 205. At this moment, the object generation unit 302 passes the generated application class loader 310 to the application memory management unit 306. The application memory management unit 306 generates the object management table 307 that corresponds to the received application class loader 310. A Java object, which is generated by instantiating the application class loader 310, is generated for each application. Therefore, if the application class loaders 310 and the object management tables 307 are associated in one-to-one correspondence, this substantially indicates that one object management table 307 is generated for each application.

In step S709, the application management unit 305 performs other installation processing, which is other than processing for generating the application class loaders 310. The other installation processing includes, for example, processing by which the application class loader management unit 308 adds an application ID and an application class loader to the application class loader management table 309.

In step S710, the application management unit 305 ends the installation of the application A 205.

Application Execution Processing

Next, a description is given of a case of starting up the application A 205, which has been installed. To start up the application A 205, the user makes an instruction to start up, from the information processing apparatus 120, and accordingly the network I/F control unit 111 receives the instruction via the network 116 and instructs the CPU 102 to start up the application A 205. When the CPU 102 receives the instruction to start up the application A 205, the application management unit 305 starts up the application A 205. When the application A 205 is started up, the panel control unit 110 displays the application icon 501 of the application A 205 on the operation panel 114. The user starts the execution of the application A 205 by selecting the application icon 501.

FIG. 8 is a flowchart showing processing from the start to the end of the execution of the application A 205, which has been installed. The processing according to this flowchart is achieved by the CPU 102 reading and executing programs stored in the external storage device 105 or the like, and causing the programs to function as components that execute the processing.

In step S801, the user selects the application icon 501 of the application A 205 on the operation panel 114. When the user selects the application icon 501, the network I/F control unit 111 receives the instruction via the network 116, and instructs the CPU 102 to start executing the processing of the application A 205. Then, the CPU 102 starts the execution of the processing of the application A 205.

In step S802, during the execution of the processing, the application A 205 determines whether or not to generate a Java object by instantiating a class. In the case of generating a Java object (YES in step S802), step S803 is executed next, and in the case of not generating a Java object (NO in step S802), step S810 is executed next.

In step S803, before generating a Java object, the application class loader 310 determines whether or not the class of the Java object has been loaded. If the class has been loaded (YES in step S803), step S806 is executed next, and if the class has not been loaded (NO in step S803), step S804 is executed next.

In step S804, if the class of the Java object to be generated has not been loaded, the application class loader 310 loads the class. The application class loader 310 reads the class file from among the application A class files 311 stored in the external storage device 105.

In step S805, when detecting that the class file has been read in step S804, the class load monitoring unit 313 transmits a bytecode insertion instruction to the bytecode insertion unit 312. The bytecode insertion unit 312 inserts a bytecode for executing object tallying processing after the bytecode for executing Java object generation processing, which is included in the class file. Object tallying processing is processing that the object generation unit 302 executes in step S809. Note that the bytecode for executing object tallying processing may be inserted before the bytecode for executing Java object generation processing. When the bytecode insertion unit 312 completes the insertion of the bytecode, class loading is ended, and step S806 is executed next.

In step S806, the bytecode execution unit 301 interprets and executes the bytecode received from the bytecode insertion unit 312.

In step S807, according to the instruction executed in step S806, the object generation unit 302 instantiates the class and generates a Java object.

In step S808, the object generation unit 302 executes Java object generation processing included in the class file.

In step S809, the object generation unit 302 executes object tallying processing. Note that in the case where the bytecode for executing object tallying processing is inserted before the bytecode for executing Java object generation processing in step S805, the order in which step S809 is executed prior to step S808 applies. Upon completion of the execution of object tallying processing, step S810 is executed.

In step S810, the application A 205 determines whether or not processing has been completed. If the processing has not been completed (NO in step S810), step S802 is executed next, and if processing has been completed (YES in step S810), step S811 is executed next.

In step S811, the application A 205 ends the processing.

Next, a specific description is given of the flow from step S801 to step S811. It is assumed that the application A 205 is an application that executes the following three sorts of processing, for example. The first sort of processing is to generate the objectA001 by instantiating the class A601. It is assumed here that the class A601 has not been loaded by the application class loader 310. The second sort of processing is to generate the objectA002 by instantiating the class A601. The third sort of processing is to set the variable val in the objectA001 to "0" (val=0).

When the user selects the application icon 501 displayed on the operation panel 114, the CPU 102 executes the processing of the application A 205. Since the application A 205 generates the objectA001 using the first sort of processing, the result of step S802 is YES. Since the class A601 has not been loaded using the first sort of processing, the result of step S803 is NO, and the application class loader 310 loads the class A601. At the loading of the class A601, the bytecode insertion unit 312 inserts the bytecode for executing object tallying processing into the bytecode of the class A601. After the bytecode has been inserted and class loading has been completed, the object generation unit 302 generates the objectA001, and executes object tallying processing. The processing of the application A 205 has not been completed when object tallying processing is completed, and accordingly the result of step S810 is NO, and the application A 205 executes the second sort of processing. Since the application A 205 generates the objectA002 using the second sort of processing, the result of step S802 is YES. Since the class A601 has been loaded using the first sort of processing, the result of step S803 is YES, and the object generation unit 302 generates the objectA002. Since the bytecode for executing object tallying processing has been inserted in the class A601 using the first sort of processing, the object generation unit 302 executes object tallying processing. The processing of the application A 205 has not been completed when object tallying processing is completed, and accordingly the result of step S810 is NO, and the application A 205 executes the third sort of processing. The application A 205 does not generate a Java object using the third sort of processing, and accordingly the result of step S802 is NO. All sorts of processing of the application A 205 are thus completed, and accordingly the result of step S810 is YES. If the result of step S810 is YES, the application A 205 ends the execution of the processing.

Object Tallying Processing

FIG. 9 is a flowchart showing object tallying processing executed by the object generation unit 302 in step S809. The processing according to this flowchart is achieved by the CPU 102 reading and executing programs stored in the external storage device 105 or the like, and causing the programs to function as components that execute the processing.

In step S901, the object generation unit 302 starts the execution of object tallying processing.

In step S902, the application A 205 identifies the application by which the Java object has been generated in step S807.

In step S903, the application memory management unit 306 adds the Java object, which was generated in step S807, to the object management table 307 for the application identified in step S902.

In step S904, the application memory management unit 306 tallies the memory usage amounts stored in the object management table 307.

In step S905, the object generation unit 302 ends the execution of object tallying processing.

According to the present embodiment as described above, during the execution of the application A 205, the bytecode insertion unit 312 inserts the bytecode for measuring the memory usage amount of the single application. When the application generates a Java object, the object generation unit 302 also executes processing according to the inserted bytecode, and the application memory management unit 306 measures the memory usage amount for each application.

Since the memory usage amount can be measured for each application, the following is possible, for example. Without modifying existing applications (e.g. Java VM) by a developer, the memory usage amount of each application can be measured by using the information processing apparatus, during the execution of the application. Since a memory usage measurement can be performed by using the information processing apparatus, for example when the maximum memory usage amount is declared for applications, it is possible to specify the application that causes a memory leak, by comparing the declared memory usage amount and the measured memory usage amount. Therefore, it is possible to specify the application that causes a memory leak, to stop the application before the entire system stops, and to improve the robustness of the system.

Second Embodiment

The following describes a second embodiment of the present invention. In the first embodiment, object tallying processing is executed when a Java object is generated during the execution of the processing of the application A 205. However, if the application A 205 or the application memory management unit 306 generates a Java object during the execution of object tallying processing (Step S809 and Steps S901 to S905), object tallying processing will be executed again. In this case, if a Java object is generated again during the execution of object tallying processing for the second time, object tallying processing will be executed again (step S809 and steps S901 to S905). In other words, there is the problem that Java object generation processing and object tallying processing are repeated, and the processing of the application A 205 does not progress.

In the present embodiment, considering the problem above, the application memory management unit 306 performs processing for determining whether or not object tallying processing is being executed. The second embodiment is configured such that when object tallying processing is being executed, the generated Java object is not added to the object management table 307. The following describes only the differences from the first embodiment, with reference to FIG. 10 to FIG. 13. Note that, in the following, the class of a Java object that is generated during the execution of object generation processing is referred to as "the specific class".

Software Configuration

Figure 10:
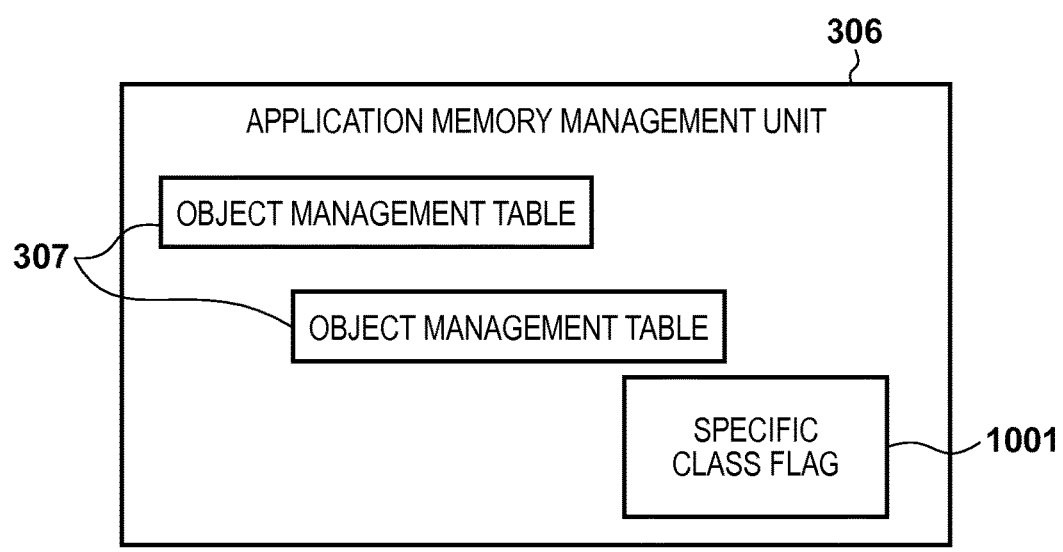
FIG. 10 is a diagram showing an example of a configuration of an application memory management unit according to a second embodiment.

FIG. 10 shows an example of a software configuration with which the application memory management unit 306 according to the second embodiment manages a specific class flag 1001. The specific class flag 1001 is a flag used for determining whether or not object tallying processing is being executed. The specific class flag 1001 usually indicates "FALSE", but indicates "TRUE" while object tallying processing is being executed.

Processing Flow

Figure 11:
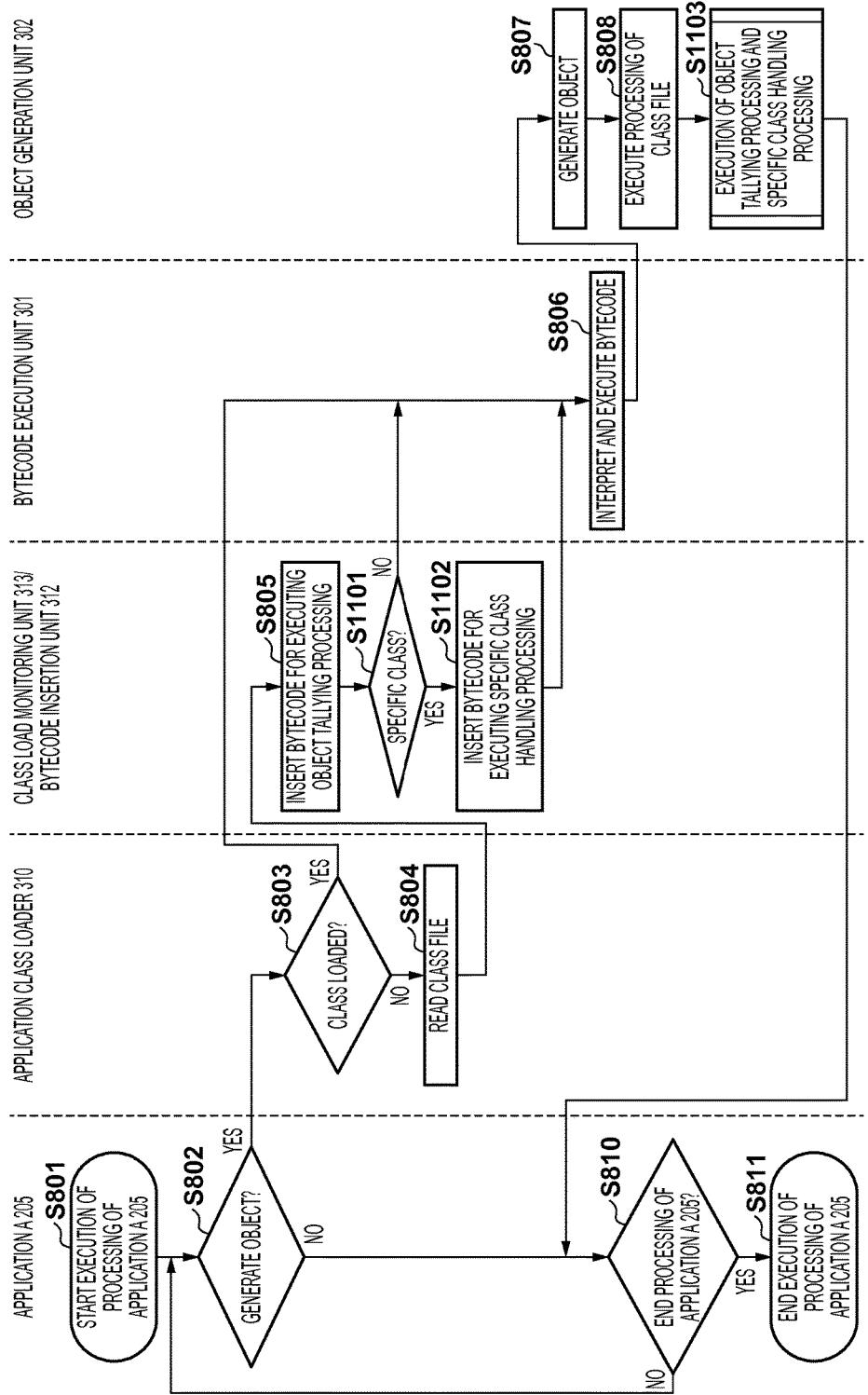
FIG. 11 is a flowchart for starting an application according to the second embodiment.

FIG. 11 is a processing flow according to the present embodiment, in which steps S1101 and S1102 are added between steps S805 and S806 of the processing flow shown in FIG. 8.

In step S1101, after inserting the bytecode for executing object tallying processing in step S805, the class load monitoring unit 313 determines whether or not the class to be loaded is the specific class. If the class is the specific class (YES in step S1101), step S1102 is executed next, and if the class is not the specific class (NO in step S1101), step S806 is executed next.

In step S1102, the bytecode insertion unit 312 inserts a bytecode for executing specific class handling processing after the bytecode for executing Java object generation processing, which is included in the class file of the specific class. To put it briefly, specific class handling processing is processing by which the object generation unit 302 makes a determination as to the specific class flag 1001 and performs control so as not to repeat object tallying processing, depending on the result of the determination. Upon completion of the insertion of the bytecode for executing specific class handling processing, step S806 is executed.

In step S1103, after class file processing has been completed (step S808) and the bytecode for executing specific class handling processing has been inserted in step S1102, the object generation unit 302 executes object tallying processing and specific class handling processing instead of step S809 in the first embodiment. Upon completion of step S1103, step S810 is executed.

Figure 12:
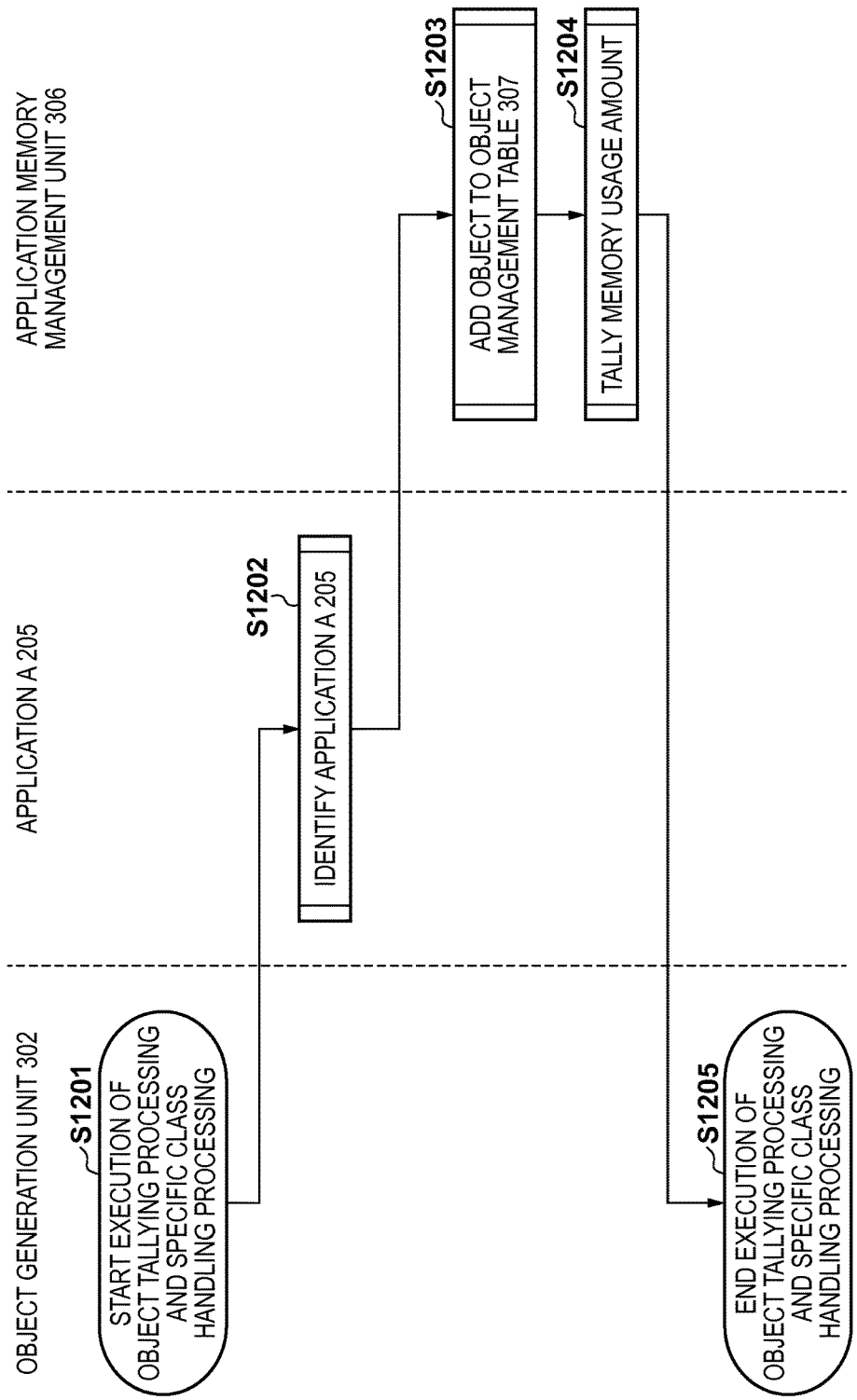
FIG. 12 is a flowchart for processing according to the second embodiment.

FIG. 12 is a flowchart showing object tallying processing and specific class handling processing executed by the object generation unit 302 in step S1103.

In step S1201, the object generation unit 302 starts the execution of object tallying processing and specific class handling processing.

In steps S1202 to S1204, the object generation unit 302 executes specific class handling processing in addition to steps S902 to S904 in the first embodiment. The details are described with reference to FIG. 13. Note that since specific class handling processing in steps S1202 to S1204 is the same as that described above, steps S1202 to S1204 in FIG. 13 are grouped and only the part that is common to these steps is described below.

In step S1205, the object generation unit 302 ends the execution of object tallying processing and specific class handling processing.

Figure 13:
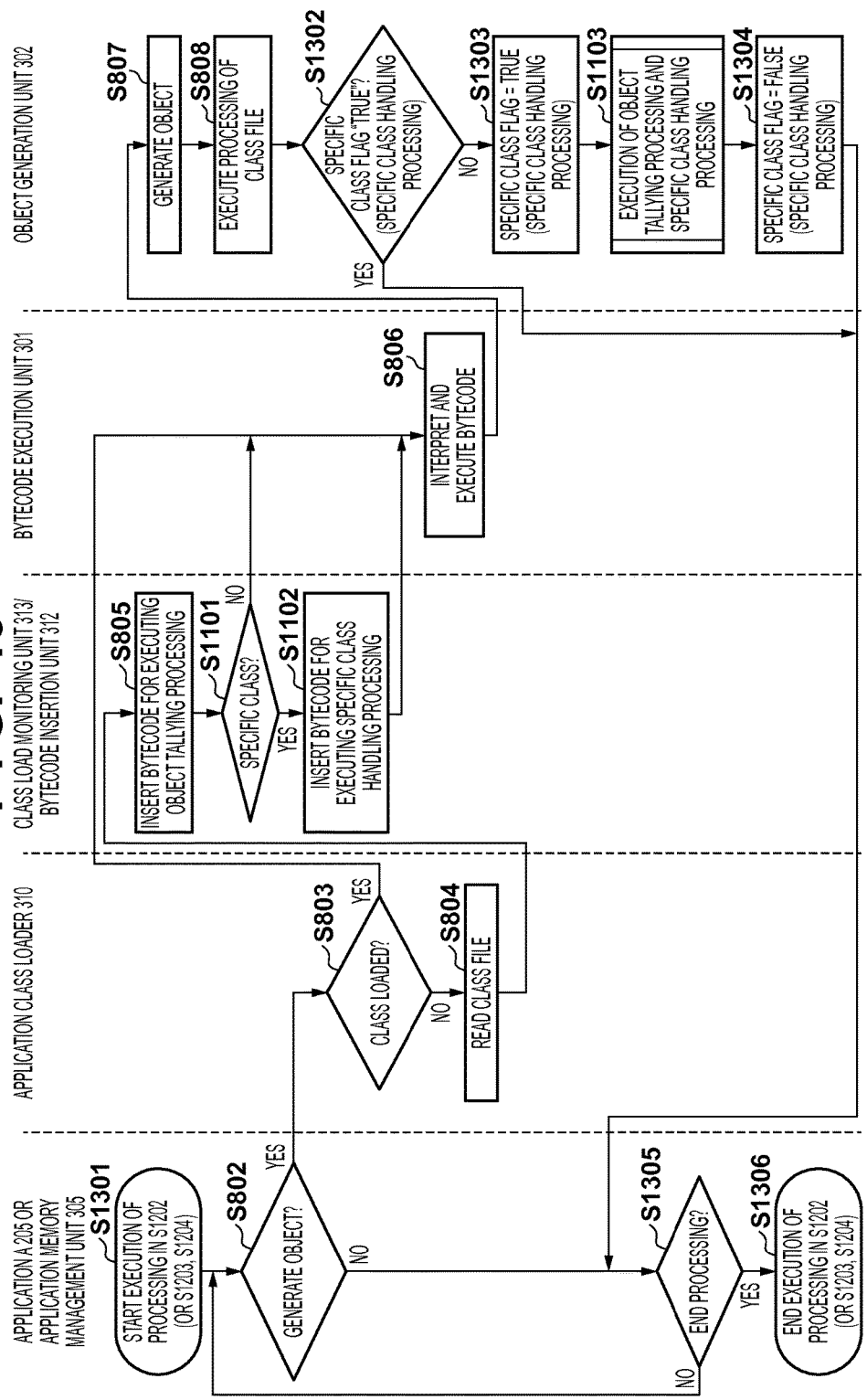
FIG. 13 is a flowchart for processing according to the second embodiment.

FIG. 13 is a flowchart showing processing executed when steps S1202 to S1204 in FIG. 12 are executed. Here, the class load monitoring unit 313, the bytecode insertion unit 312, the bytecode execution unit 301, and the object generation unit 302 perform basically the same processing as the processing shown in FIG. 8. The differences lie in that the class load monitoring unit 313 executes step S1101, the bytecode insertion unit 312 executes step S1102, and the object generation unit 302 executes step S1103 and steps S1302 to S1304. Note that steps S1101 to S1103 are the same as those described above, and their description is omitted here.

In step S1301, the application A 205 ends the processing in step S1202. Alternatively, the application memory management unit 306 starts the processing in step S1203 or step S1204. Here, whether it is the application A 205 that starts the execution or it is the application memory management unit 306 that starts the execution is determined depending on which step has been started to be executed from among steps S1202 to S1204. Upon the starting of the execution, step S802 is executed.

In step S1302, the object generation unit 302 executes Java object generation processing, and then performs determination as to the specific class flag 1001 in the application memory management unit 306. If the specific class flag 1001 indicates "TRUE" (YES in step S1302), step S1305 is executed next, and if it indicates "FALSE" (NO in step S1302), step S1303 is executed next.

In step S1303, the object generation unit 302 sets the specific class flag 1001 to "TRUE". Then, step S1103 is executed next.

Upon completion of the processing in step S1103, the object generation unit 302 sets the specific class flag 1001 to "FALSE" in step S1304. Upon the setting of the specific class flag 1001 to "FALSE", specific class handling processing ends and step S1305 is executed next.

In step S1305, the application A 205 determines whether or not to end the processing in step S1202. Alternatively, the application memory management unit 306 determines whether or not to end the processing in step S1203 or step S1204. Here, if the processing has not been completed (NO in step S1305), step S802 is executed next, and if the processing has been completed (YES in step S1305), step S1306 is executed next.

In step S1306, the application A 205 starts the processing in step S1202. Alternatively, the application memory management unit 306 ends the execution of the processing in step S1203 or step S1204.

In the second embodiment, the bytecode insertion unit 312 inserts a bytecode for making a determination as to the specific class flag into the class of the Java object that is to be generated during the execution of object tallying processing. The application A 205 or the application memory management unit 306 generates the Java object during the execution of object tallying processing, and then the object generation unit 302 also executes the processing of the bytecode thus inserted. Therefore, it is possible to avoid repeating the generation of the Java object and the execution of object tallying processing.

Third Embodiment

The following describes a third embodiment of the present invention. In the first embodiment, in the case where a plurality of applications have been installed in the information processing apparatus 100, the memory usage amount is measured in the same manner for all of the applications. However, the memory usage amount may be measured with respect to only a specified application, and not all of the applications. In some cases, applications to be specified are not applications that have been installed in the information processing apparatus 100 from the beginning, but are applications that the user installs later, for example. In the following, applications that have been installed in the information processing apparatus 100 from the beginning are referred to as "system applications". In the present embodiment, memory usage amount measurement/tallying is not executed for system applications.

In the embodiments above, the bytecode for executing object tallying processing is inserted after every bytecode for executing Java object generation processing, and object tallying processing is executed at Java object generation. Then, during object tallying processing, pieces of information about the generated Java objects are added to the object management table 307. However, if the bytecode for executing object tallying processing is inserted after every bytecode for executing Java object generation processing, the memory usage amount measurement is performed for every application to be started.

In the present embodiment, object tallying processing additionally includes processing for determining whether or not an application that attempts to generate a Java object is a subject of the measurement, before adding information about a generated Java object to the object management table 307. If the application that generates the Java object is a subject of the measurement, information about the generated Java object is added to the object management table 307, and if the application is not a subject of the measurement, object tallying processing ends. The following describes only the differences from the first embodiment, with reference to FIG. 14 to FIG. 16.

Software Configuration

FIG. 14 shows an example of a software configuration with which the application memory management unit 306 according to the third embodiment manages a measurement flag 1401. The measurement flag 1401 is a flag used for determining whether or not the application that attempts to generate a Java object is a subject of the measurement. The measurement flag 1401 is defined for each application, and it usually indicates "TRUE", but if the application installed in the information processing apparatus 100 is a system application, the measurement flag 1401 indicates "FALSE".

Processing Flow

Figure 15:
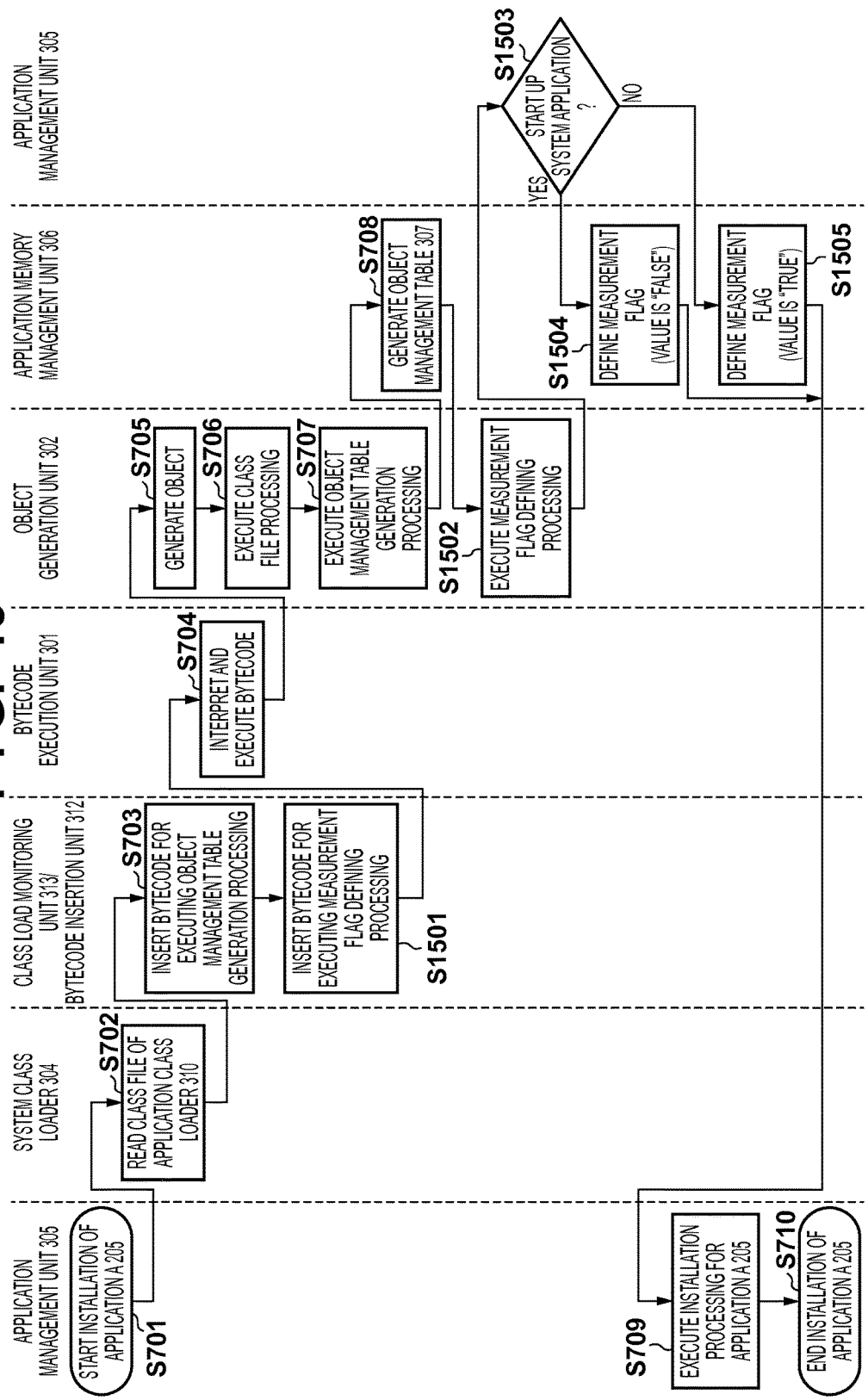
FIG. 15 is a flowchart for installing an application according to the third embodiment.

FIG. 15 shows a processing flow according to the present embodiment, and in contrast to the processing flow shown in FIG. 7, step S1501 is added between steps S703 and S704, and steps S1502 to S1505 are added between steps S708 and S709.

In step S1501, the bytecode insertion unit 312 inserts a bytecode for executing measurement flag defining processing after the bytecode for executing object management table generation processing. The insertion of this bytecode is executed after the insertion of the bytecode for executing object management table generation processing in step S703. Measurement flag defining processing is processing for defining the measurement flag 1401 for the application memory management unit 306. Upon completion of the insertion of the bytecode, step S704 is executed.

In step S1502, after generating the object management table 307 (step S708), the object generation unit 302 executes measurement flag defining processing.

In step S1503, the application management unit 305 determines whether or not the application to be installed is a system application. If the application is a system application (YES in step S1503), step S1504 is executed next, and if the application is not a system application (NO in step S1503), step S1505 is executed next.

In step S1504, the application memory management unit 306 defines the measurement flag 1401 by setting the initial value to "FALSE". Then, step S709 is executed.

In step S1505, the application memory management unit 306 defines the measurement flag 1401 by setting the initial value to "TRUE". Then, step S709 is executed.

Figure 16:
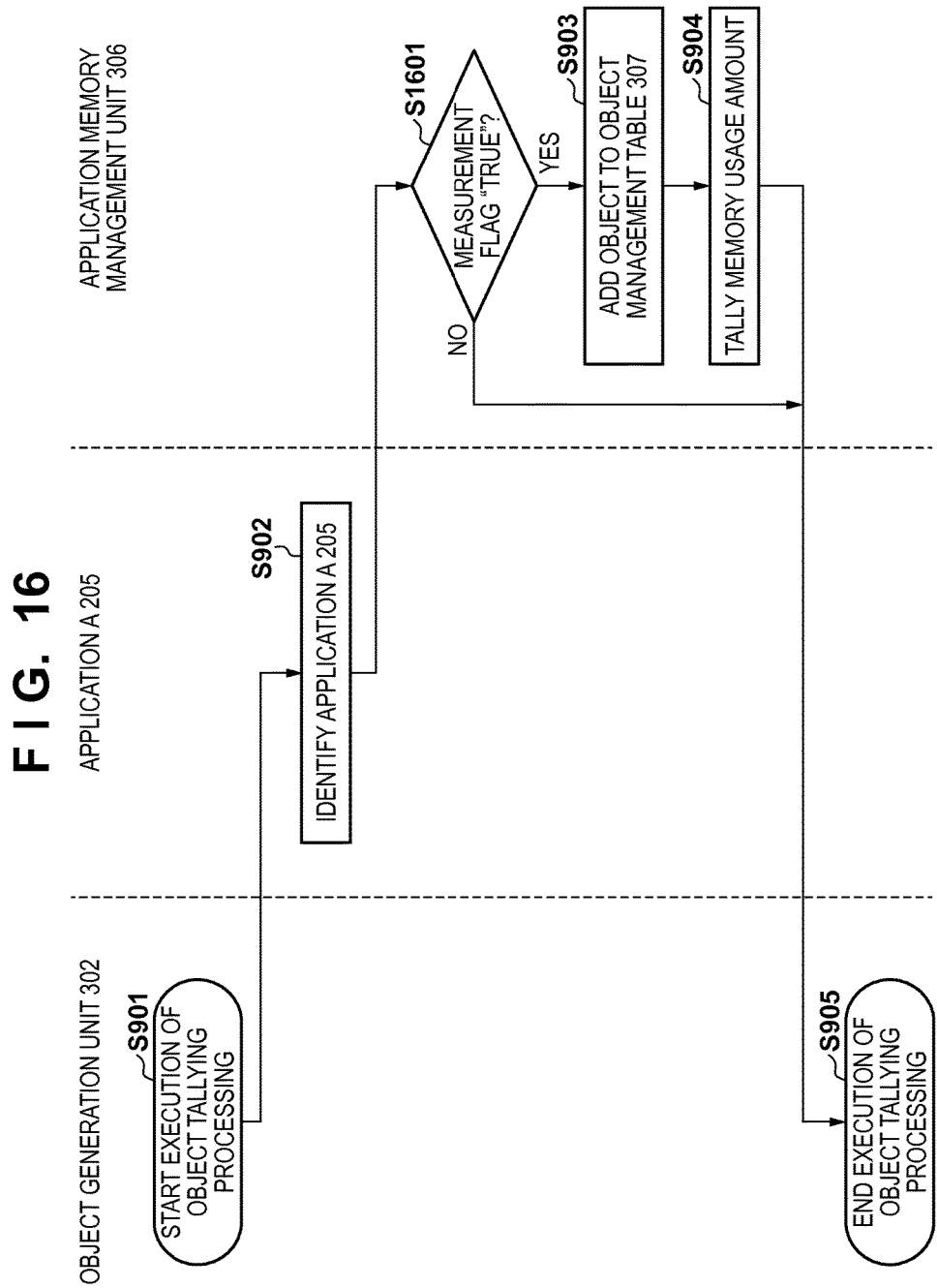
FIG. 16 is a flowchart for object tallying processing according to the third embodiment.

FIG. 16 is a flowchart for object tallying processing according to the present embodiment, and in contrast to the processing flow shown in FIG. 9, step S1601 is added between steps S902 and S903.

After identifying the application (step S902), the application memory management unit 306 determines in step S1601 whether or not the measurement flag 1401 indicates "TRUE". If the measurement flag 1401 indicates "TRUE" (YES in step S1601), step S903 is executed next, and if it indicates "FALSE" (NO in step S1601), step S905 is executed next.

In the third embodiment, the bytecode for executing measurement flag defining processing is inserted after the bytecode for executing Java object generation processing. Also, a bytecode for executing measurement flag determination processing is inserted into object tallying processing. Then, a determination is made as to whether or not the application that attempts to generate the Java object is a subject of the measurement, and then information about the generated Java object is added to the object management table 307. With this configuration, the memory usage amount measurement can be performed with respect to only a specified application, and not all of the applications. In the present embodiment, system applications are excluded from the subjects of the measurement and tallying. However, some of the applications that the user newly installed may be excluded from the subjects of the measurement and tallying. If this is the case, a UI screen or the like may be provided, and the user may be allowed to select an application that is to be a subject.

Fourth Embodiment

The following describes a fourth embodiment of the present invention. In the first embodiment, the memory usage amount is measured for applications. The measurement may be additionally performed on other resources of the information processing apparatus, such as sockets, threads, file descriptors, etc. In the following, the resources of the information processing apparatus other than the memory, such as sockets, threads, file descriptors, etc., are referred to as "measurement subject resources".

In the embodiments above, object tallying processing is executed at Java object generation. Then, during object tallying processing, information about the generated Java object is added to the object management table 307, and the tallying of the memory usage amounts is executed. However, since only the memory usage amount is measured, the usage amount of other measurement subject resources cannot be measured.

In the present embodiment, considering this problem, when pieces of information about Java objects added to the object management table 307 are tallied, additional processing is executed for determining whether or not the Java objects are measurement subject resources. When Java objects are measurement subject resources, the number of Java objects that are measurement subject resources is counted. The following describes only the differences from the first embodiment, with reference to Table 3, FIG. 17, and FIG. 18.

Table 3 shows the object management table 307, which is the object management table 307 according to the first embodiment (Table 1) to which measurement subject resource flags are added. The measurement subject resource flags are flags used for determining whether or not the Java objects added to the object management table 307 are measurement subject resources. In the present embodiment, the application memory management unit 306 generates the object management table 307 including the measurement subject resource flags.

TABLE 3

| Generated object | Memory usage amount | Measurement subject resource flags | | |
|---|---|---|---|---|
| | | Thread | Socket | File descriptor |
| ObjectA001 | 100 KB | FALSE | FALSE | FALSE |
| ObjectA002 | 120 KB | TRUE | FALSE | FALSE |
| ObjectA003 | 80 KB | FALSE | TRUE | FALSE |

The measurement subject resource flag is defined for each measurement subject resource such as a thread, a socket, a file descriptor, etc. The measurement subject resource flag usually indicates "FALSE", but indicates "TRUE" when the generated Java object is the measurement subject resource. For example, as shown in Table 3, when the objectA002 is a Java object generated by instantiating a socket class, the measurement subject resource flag of the socket of the objectA002 indicates "TRUE". Similarly, if the objectA003 is a Java object generated by instantiating a thread class, the measurement subject resource flag of the thread of the objectA003 indicates "TRUE". If the generated Java object is not a measurement subject resource, all the measurement subject resource flags indicate "FALSE", like those of the objectA001. In the present embodiment, threads, sockets, and file descriptors are shown as examples of the measurement subject resources. However, the measurement subject resources are not limited to the above, and other sorts of resources that the information processing apparatus uses when executing processing may be subjects. Also, a UI screen or the like may be provided, and the user may be allowed to select a resource that is to be a subject.

Processing Flow

Figure 17:
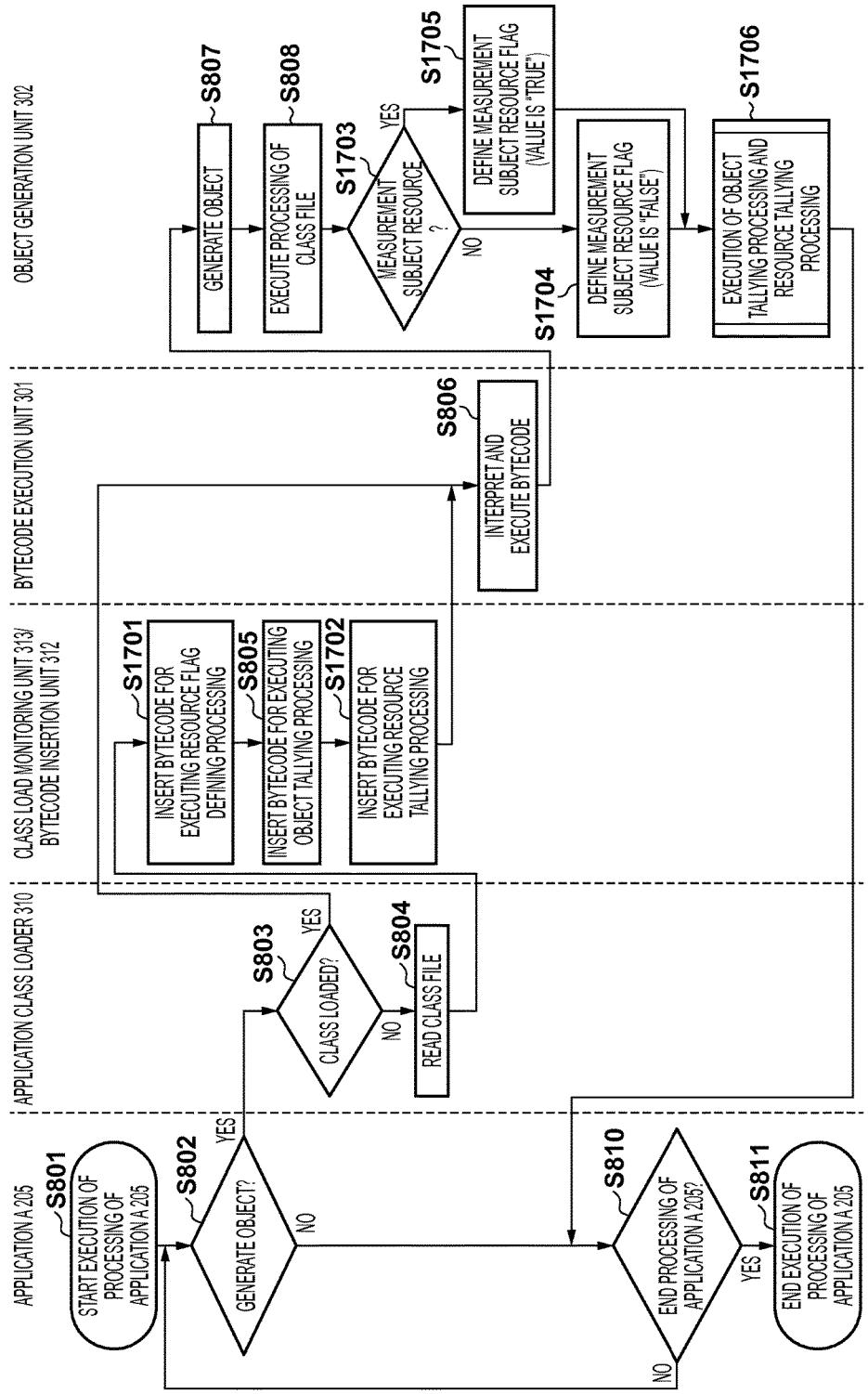
FIG. 17 is a flowchart for starting an application according to a fourth embodiment.

FIG. 17 is a processing flow according to the present embodiment, and in contrast to the processing flow shown in FIG. 8, steps S1701 and S1702 are added between steps S804 and S806, and steps S1703 to S1706 are added between steps S808 and S810.

When the class load monitoring unit 313 detects that a class file has been read, the bytecode insertion unit 312, in step S1701, inserts a bytecode for executing measurement subject resource flag defining processing after the bytecode for executing Java object generation processing. Measurement subject resource flag defining processing is processing for defining the measurement subject resource flags for the Java objects, according to whether or not the generated Java objects are measurement subject resources. Upon completion of the insertion of the bytecode, step S805 is executed.

In step S1702, after inserting the bytecode for executing object tallying processing in step S805, the bytecode insertion unit 312 inserts a bytecode for executing measurement subject resource tallying processing. Measurement subject resource tallying processing is processing by which the application memory management unit 306 counts the number of measurement subject resource flags whose values in the object management table 307 are "TRUE". Upon completion of the insertion of the bytecode, step S806 is executed.

In step S1703, after executing Java object generation processing (step S808), the object generation unit 302 determines whether or not the generated Java object is a measurement subject resource. If the generated Java object is a measurement subject resource (YES in step S1703), step S1704 is executed next, and if it is not a measurement subject resource (NO in step S1703), step S1705 is executed next.

In step S1704, the object generation unit 302 defines the measurement subject resource flag by setting the initial value to "FALSE". Then, step S1706 is executed next.

In step S1705, the object generation unit 302 defines the measurement subject resource flag by setting the initial value to "TRUE". Then, step S1706 is executed next.

By inserting the bytecode for executing resource tallying processing in step S1702, the object generation unit 302 executes object tallying processing and resource tallying processing in step S1706 instead of step S809 in the first embodiment. Upon completion of step S1706, step S810 is executed.

Object Tallying Processing and Resource Tallying Processing

FIG. 18 is a flowchart showing object tallying processing and resource tallying processing executed by the object generation unit 302 in step S1706 in FIG. 17.

In step S1801, the object generation unit 302 starts the execution of object tallying processing and resource tallying processing. Upon the starting of the execution, step S902 is executed.

In step S1802, after executing the memory usage tallying in step S904, the application memory management unit 306 counts the number of measurement subject flags that indicate "TRUE" in the object management table 307. This counting is executed for each thread, each socket, and each file descriptor, i.e., for each measurement subject resource. The results of this counting are the results of the usage amount measurement for the measurement subject resources. Upon completion of the measurement subject resource tallying, step S1803 is executed.

In step S1803, upon completion of the measurement subject resource tallying, the object generation unit 302 ends the execution of object tallying processing and resource tallying processing.

In the fourth embodiment, measurement subject resource flag defining processing and measurement subject resource tallying processing are inserted after the bytecode for executing Java object generation processing. Then, when the Java object is a measurement subject resource, the application memory management unit 306 performs counting, and tallies the usage amounts. With this configuration, the usage amount of measurement subject resources other than the memory usage amount can be measured.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-216634, filed Oct. 23, 2014, which is hereby incorporated by reference herein in its entirety.

What is claimed is:

1. An information processing apparatus that includes a plurality of applications that execute processing by using a bytecode that is included in a class file, the apparatus comprising at least a processor and at least a memory coupled to the at least the processor and having stored thereon instructions, when executed by the at least the processor, and cooperating to act as:
an insertion unit configured to insert a bytecode into a class file corresponding to an application;
wherein, when the application is installed into the information processing apparatus, a first bytecode for generating a management table corresponding to the application is inserted into the class file by the insertion unit, the first bytecode is executed, and, by execution of the first bytecode, the management table corresponding to the application is generated,
wherein, when the application is executed by the information processing apparatus, the insertion unit inserts, into the class file, a second bytecode for tallying, based on the management table corresponding to the application, information about a resource used by an object generated by the application, and a third bytecode for performing control to the object generated during the execution of the second bytecode so as not to execute the second bytecode,
wherein, when a new object generated by the application is not the object generated during the execution of the second bytecode, the second bytecode is executed, and
wherein, when the new object generated by the application is the object generated during the execution of the second bytecode, the third bytecode is executed.

2. The information processing apparatus according to claim 1, wherein by execution of the second bytecode,
the application that has executed the second bytecode is identified,
the specified application and the information about a resource used by an object generated by the application are registered to the management table in association with each other, and
a resource usage amount for the application is tallied based on the information registered in the management table.

3. The information processing apparatus according to claim 1, wherein an determination of an object is performed based on a flag indicating whether the object is an object generated during the execution of the second bytecode,
if it is determined based on the flag that an object generated by the application is not an object generated during the execution of the second bytecode, an value of the flag is changed from false to true, and after the execution of the second bytecode, the value of the flag is returned from true to false.

4. The information processing apparatus according to claim 1, wherein the insertion unit further inserts an fourth bytecode for defining an measurement flag indicating that the application is a target that executes the second bytecode,
the fourth bytecode is executed after the execution of the first bytecode,
if it is determined that the application is a target that executes the second bytecode, the measurement flag is set to the application, and the second bytecode is executed based on the set measurement flag.

5. The information processing apparatus according to claim 1,
wherein the insertion unit further inserts a fifth bytecode for setting a type of a resource to be tallied, and
when the second bytecode is executed, the resource is tallies whose type is set by the execution of the fifth bytecode.

6. The information processing apparatus according to claim 5,
wherein the type of a resource is at least one of a memory, a thread, a socket, and a file descriptor.

7. A method for controlling an information processing apparatus that includes a plurality of applications that execute processing by using a bytecode that is included in a class file, the method comprises:
an insertion step of inserting, with an insertion unit, a bytecode into a class file corresponding to an application;
wherein, when the application is installed into the information processing apparatus, a first bytecode for generating a management table corresponding to the application is inserted into the class file by the insertion unit, the first bytecode is executed, and, by execution of the first bytecode, the management table corresponding to the application is generated,
wherein, when the application is executed by the information processing apparatus, a second bytecode for tallying, based on the management table corresponding to the application, information about a resource used by an object generated by the application, and a third bytecode for performing control to the object generated during the execution of the second bytecode so as not to execute the second bytecode are inserted into the class file in the insertion step,
wherein, when a new object generated by the application is not the object generated during the execution of the second bytecode, the second bytecode is executed, and
wherein, when the new object generated by the application is the object generated during the execution of the second bytecode, the third bytecode is executed.

8. A non-transitory computer-readable medium storing a program for causing a computer to function as:
an insertion unit configured to insert a bytecode into a class file corresponding to an application;
wherein, when the application is installed into the information processing apparatus, a first bytecode for generating a management table corresponding to the application is inserted into the class file by the insertion unit, the first bytecode is executed, and, by execution of the first bytecode, the management table corresponding to the application is generated,
wherein, when the application is executed by the information processing apparatus, the insertion unit inserts, into the class file, a second bytecode for tallying, based on the management table corresponding to the application, information about a resource used by an object generated by the application, and a third bytecode for performing control to the object generated during the execution of the second bytecode so as not to execute the second bytecode,
wherein, when a new object generated by the application is not the object generated during the execution of the second bytecode, the second bytecode is executed, and
wherein, when the new object generated by the application is the object generated during the execution of the second bytecode, the third bytecode is executed.

* * * * *